US012200525B2

United States Patent
He

(10) Patent No.: US 12,200,525 B2
(45) Date of Patent: Jan. 14, 2025

(54) RRM RELAXATION FOR STATIONARY USER EQUIPMENT

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/237,916

(22) Filed: Apr. 22, 2021

(65) Prior Publication Data
US 2021/0352507 A1 Nov. 11, 2021

Related U.S. Application Data

(60) Provisional application No. 63/022,429, filed on May 8, 2020.

(51) Int. Cl.
 *H04W 8/24* (2009.01)
 *H04W 24/10* (2009.01)
 *H04W 56/00* (2009.01)
 *H04W 76/27* (2018.01)

(52) U.S. Cl.
 CPC .............. *H04W 24/10* (2013.01); *H04W 8/24* (2013.01); *H04W 56/001* (2013.01); *H04W 76/27* (2018.02)

(58) Field of Classification Search
 CPC ..... H04W 24/10; H04W 8/24; H04W 56/001; H04W 76/27; H04W 52/0216; H04W 52/0219; H04W 52/0232; H04W 52/0258; Y02D 30/70
 See application file for complete search history.

(56) References Cited

U.S. PATENT DOCUMENTS

| 2013/0079049 A1* | 3/2013 | Yu ..................... H04W 48/16 455/524 |
| 2022/0217565 A1* | 7/2022 | Thangarasa ....... H04W 56/0015 |
| 2022/0394532 A1* | 12/2022 | Thangarasa ....... H04W 52/0209 |

FOREIGN PATENT DOCUMENTS

| CN | 105792243 A | 7/2016 |
| CN | 110114998 A | 8/2019 |

OTHER PUBLICATIONS

Catt: "WF on RRM Measurement Relaxation for Power Saving", 3GPP Draft, 3GPP TSG-RAN WG4 Meeting #94ebis, R4-2005330, 3rd Generation Partnership Project (3GPP), Mobile Competence Centre, vol. RAN WG4, No. Online Meeting, Default_Value May 4, 2020 (May 4, 2020), XP051880286, 7 Pages, Retrieved from the Internet: URL: https://ftp.3gpp.org/tsg_ran/WG4_Radio/TSGR4_94_eBis/Docs/R4-2005330.zip Draft R4-2005330 WF on RRM Measurement Relaxation for NR Power Saving-v3.pptx [retrieved on May 4, 2020] slides 2-7.

(Continued)

*Primary Examiner* — Chuong A Ngo
(74) *Attorney, Agent, or Firm* — Procopio, Cory, Hargreaves & Savitch LLP

(57) ABSTRACT

To more efficiently utilize resources, a UE may receive, from a base station, RRM measurement relaxation criteria for a stationary UE. The UE may skip one or more RRM measurements based on the RRM measurement relaxation criteria for the stationary UE.

54 Claims, 8 Drawing Sheets

(56) References Cited

OTHER PUBLICATIONS

Ericsson (Email Rapporteur): "[98#52] [NB-IoT] Power Consumption for RRM", 3GPP Draft, 3GPP TSG-RAN2 Meeting #99, R2-1708277 Email Report 98_52 Power Consumption for RRM, 3rd Generation Partnership Project (3GPP), Mobile Competence Centre, vol. RAN WG2, No. Berlin, Germany, Aug. 21, 2017-Aug. 25, 2017 Aug. 20, 2017 (Aug. 20, 2017), XP051318174, pp. 1-12, Retrieved from the Internet: URL:http://www.3gpp.org/ftp/Meetings_3GPP_SYNC/RAN2/Docs/ [retrieved on Aug. 20, 2017] p. 9-p. 10.
International Search Report and Written Opinion—PCT/US2021/030581—ISA/EPO—dated Sep. 1, 2021.
LG Electronics Inc: "Further Considerations on RRM Relaxation About Reporting and Coexistence with Early Measurements", 3GPP Draft, 3GPP TSG-RAN WG2 Meeting #107bis, R2-1913940, 3rd Generation Partnership Project (3GPP), Mobile Competence Centre, vol. RAN WG2, No. Chongqing, China, Oct. 14, 2019-Oct. 18, 2019, Oct. 7, 2019 (Oct. 7, 2019), XP051787424, pp. 1-2, Retrieved from the Internet: URL:http://www.3gpp.org/ftp/tsg_ran/WG2_RL2/TSGR2_107bis/Docs/R2-1913940.zip, [retrieved on Oct. 7, 2019] chapter 2.
Mediatek Inc: "Configurations for RRM Measurement Relaxation in NR", 3GPP Draft, 3GPP TSG-RAN WG2 Meeting #109 electronic, R2-2000312, 3rd Generation Partnership Project (3GPP) Mobile Competence Centre, vol. RAN WG2, No. Elbonia, Feb. 24, 2020-Mar. 6, 2020 Feb. 14, 2020 (Feb. 14, 2020), XP051848938, pp. 1-5, Retrieved from the Internet: URL:https://ftp.3gpp.org/tsg_ran/WG2_RL2/TSGR2_109_e/Docs/R2-2000312.zip R2-2000312 Configurations for RRM Measurement Relaxation in NR.docx [retrieved on Feb. 14, 2020] chapter 2.
Nokia, et al., "Power Consumption Reduction in RRM Measurements", 3GPP Draft, 3GPP TSG-RAN WG2 Meeting #62, R2-1906697 (update of) R2-1904309 Power Consumption Reduction in RRM Measurements, 3rd Generation Partnership Project (3GPP), Mobile Competence Centre, vol. RAN WG2, No. Reno, USA, May 13, 2019-May 17, 2019 May 13, 2019 (May 13, 2019), XP051730154, 6 Pages, Retrieved from the Internet: URL:http://www.3gpp.org/ftp/Meetings%5F3GPP%5FSYNC/RAN2/Docs/R2%2D1906697%2Ezip [retrieved on May 13, 2019] chapter 2.2.

\* cited by examiner

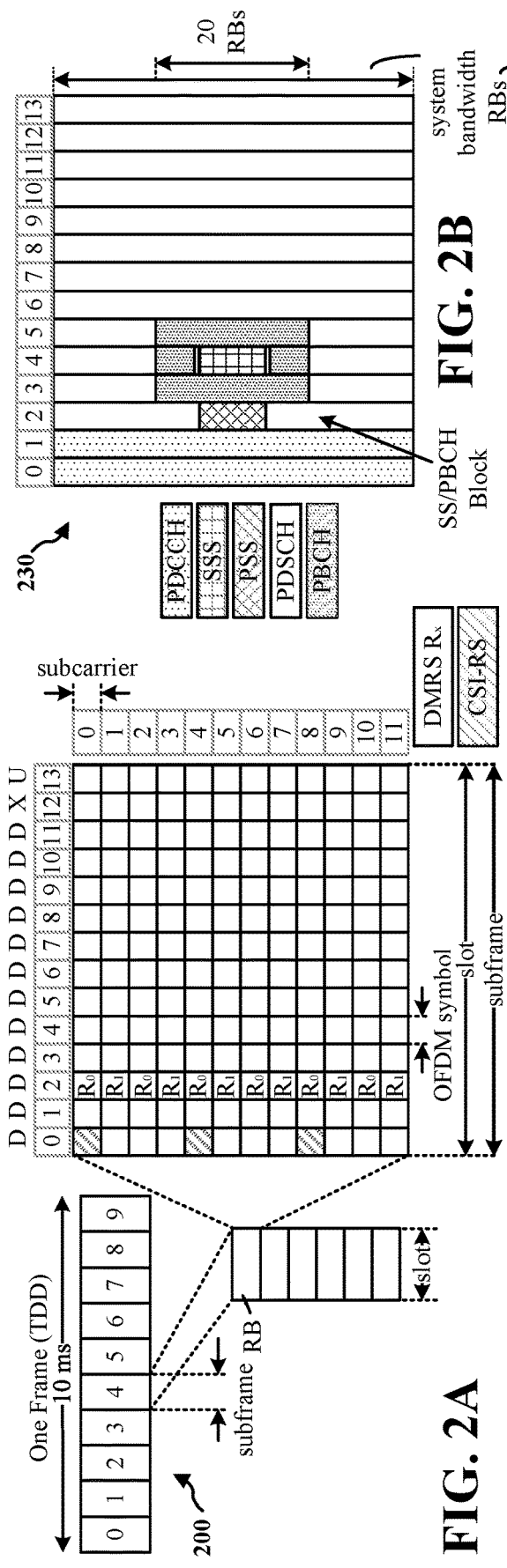
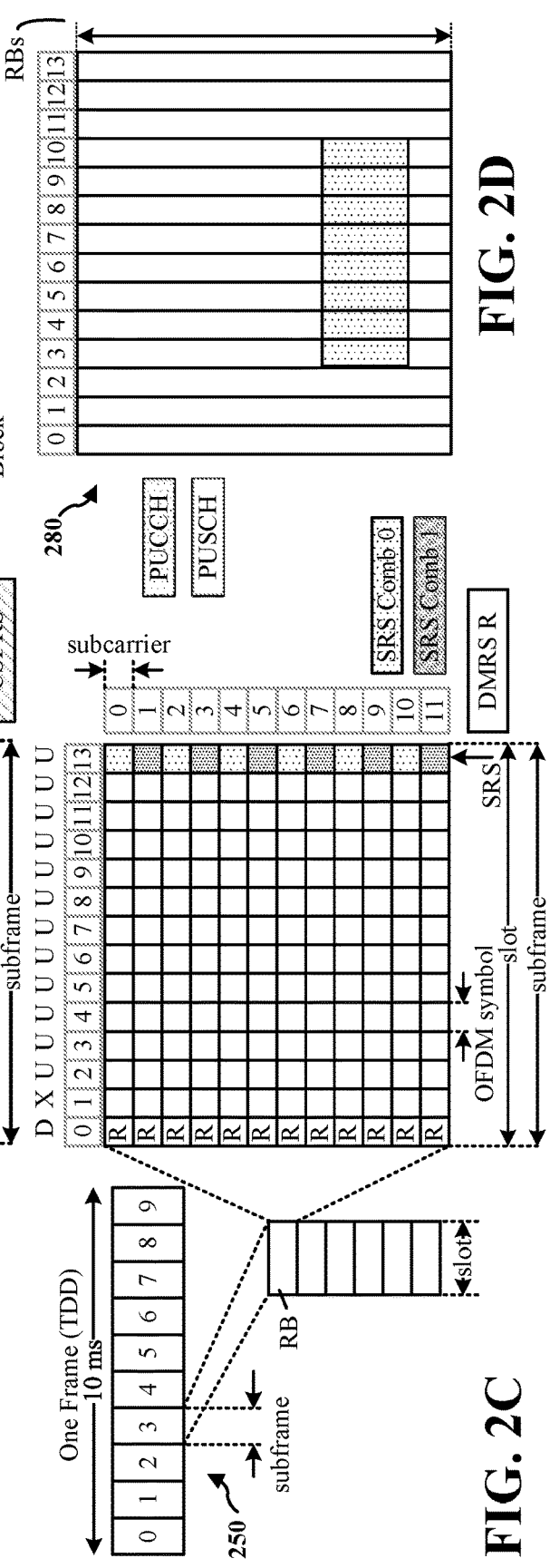

RRM RELAXATION FOR STATIONARY USER EQUIPMENT

CROSS REFERENCE TO RELATED APPLICATION(S)

This application claims the benefit of U.S. Provisional Application Ser. No. 63/022,429, entitled "RRM Relaxation for Stationary User Equipment" and filed on May 8, 2020, which is expressly incorporated by reference herein in its entirety.

BACKGROUND

Technical Field

The present disclosure relates generally to communication systems, and more particularly, to wireless communication including radio resource management (RRM) measurement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Radio resource management (RRM) is used to manage various aspects of wireless communication, such as transmission power, user equipment allocation, beamforming, data rate, modulation scheme, or the like. RRM helps to ensure efficient use of available resources. To perform RRM on a system level, a user equipment (UE) may perform and report various RRM measurements.

In addition to mobile user equipment (UE) that change physical location, wireless communication may also involve UEs that are stationary. Because the stationary UEs do not move in the physical world, a stationary UE's connection with a serving cell might not fluctuate as much as a mobile UE. Aspects presented herein enable the stationary UEs to perform different RRM measurements, e.g., which may relate to different configurations or different requirements than mobile UEs. The aspects presented herein, including the potential for reduced measurements and reporting may improve the efficient allocation of resources for the stationary UEs.

To more efficiently utilize resources, a UE may determine that the UE meets RRM measurement relaxation criteria for a stationary UE. The UE may skip one or more RRM measurements in response to determining that the UE meets the RRM measurement relaxation criteria for the stationary UE. The UE may signal to the base station that the UE is a stationary UE before skipping the RRM measurements. A stationary UE may skip RRM measurements regardless of its location in a cell as long as the signal strength meets a performance threshold.

In an aspect of the disclosure, a method, a computer-readable medium, and an apparatus are provided. The apparatus is configured to receive, from a base station, resource management (RRM) measurement relaxation criteria for a stationary UE. The apparatus is further configured to skip one or more RRM measurements based on the RRM measurement relaxation criteria for the stationary UE.

In another aspect of the disclosure, a method, a computer-readable medium, and an apparatus are provided. The apparatus is configured to receive an indication from a UE that the UE is stationary. The apparatus is further configured to transmit, in response to the indication, a configuration comprising the RRM measurement relaxation criteria for the stationary UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
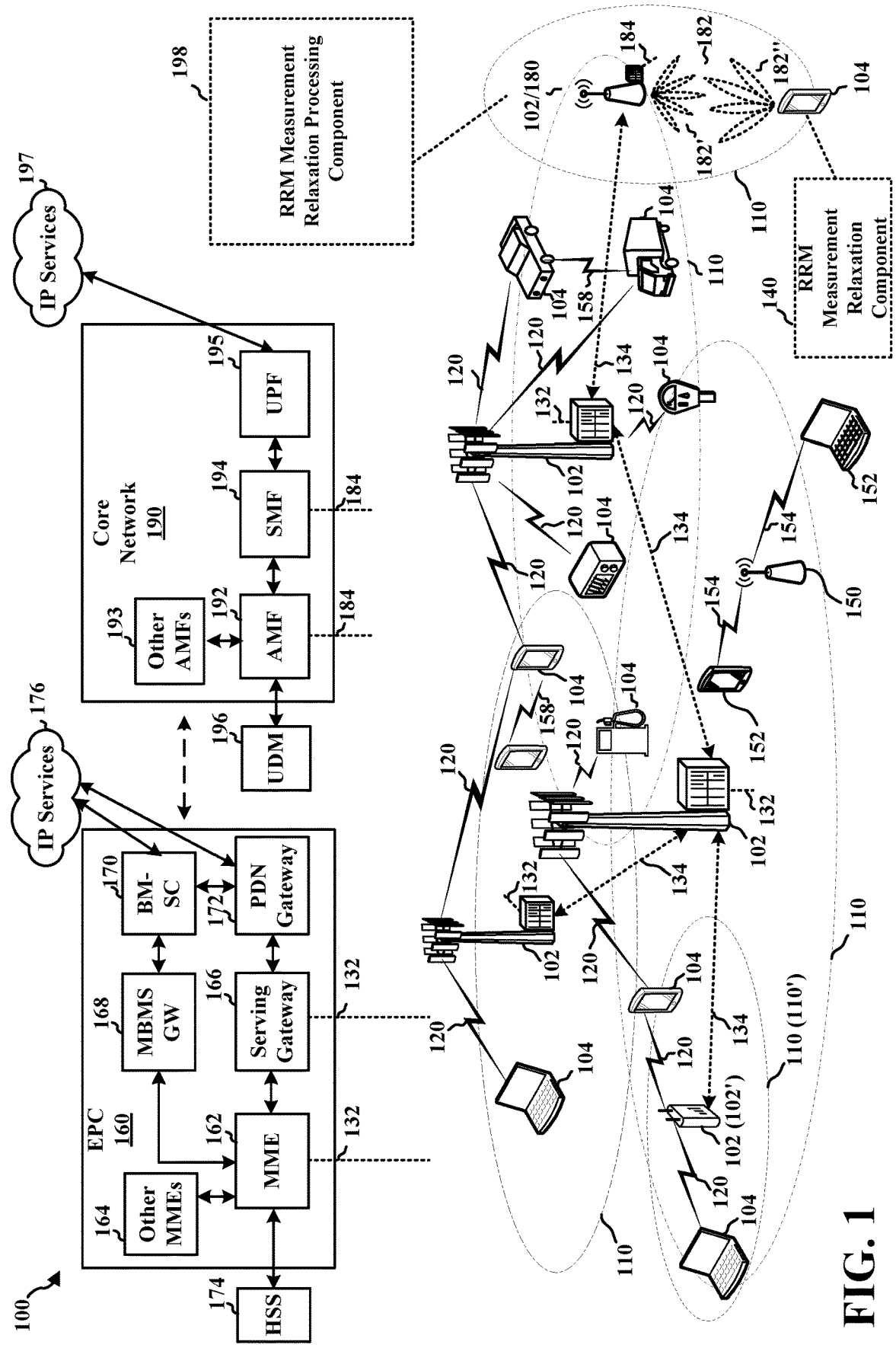
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include an RRM measurement relaxation component 140. The RRM measurement relaxation component 140 may be configured to receive, from a base station, RRM measurement relaxation criteria for a stationary UE. The RRM measurement relaxation component 140 may be configured to skip one or more RRM measurements based on the RRM measurement relaxation criteria for the stationary UE. The RRM measurement relaxation component 140 may be configured to indicate to a base station that the UE is stationary.

In some aspects, one or more base stations 102/180 may include an RRM measurement relaxation processing component 198 configured to receive an indication from a UE that indicates the UE is stationary. The RRM measurement relaxation processing component 198 may be further configured to transmit, in response to the indication, a configuration comprising the RRM measurement relaxation criteria for the stationary UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may be associated with a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
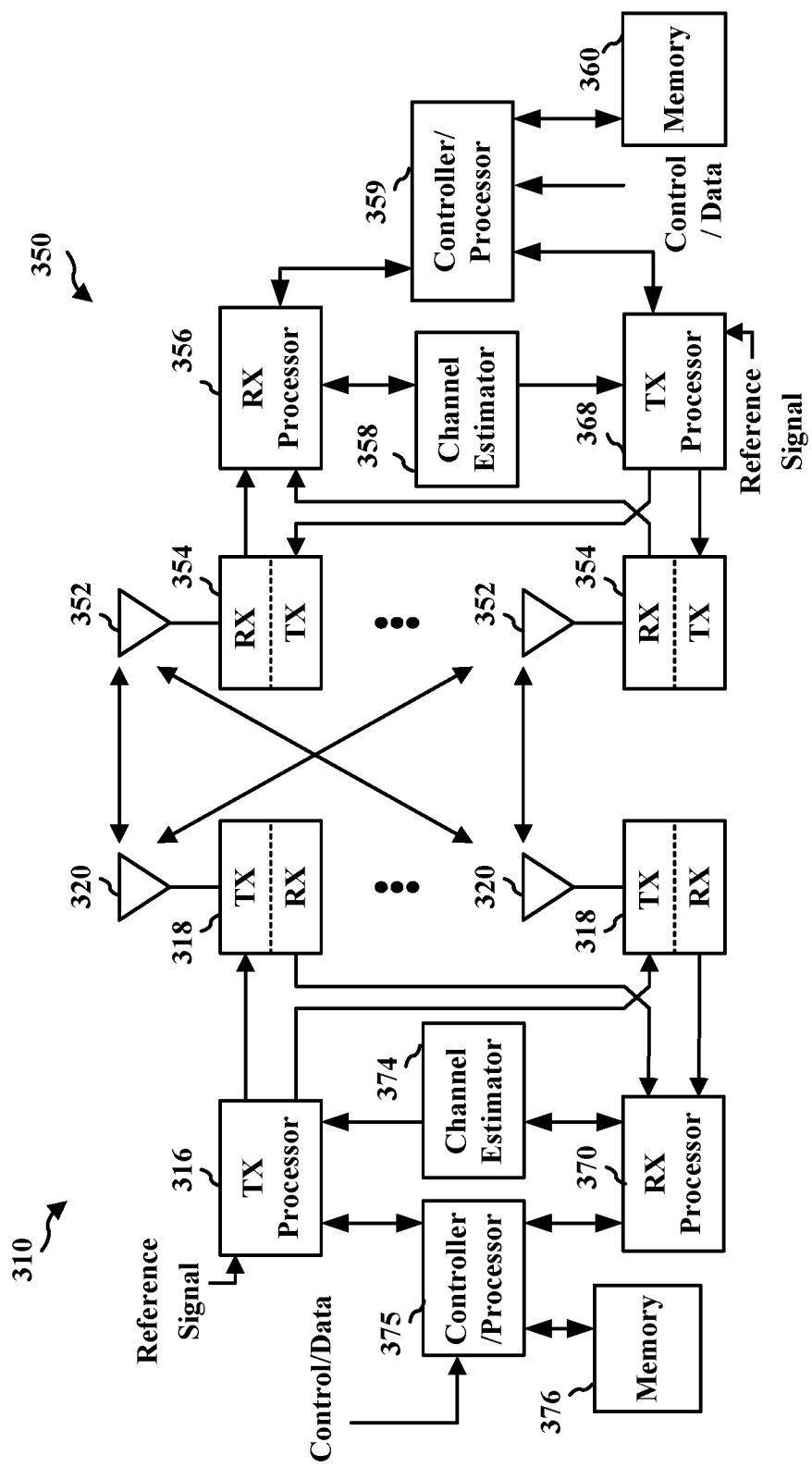
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 140 of FIG. 1.

At least one of the TX processor 316, the RX processor 370, and the controller/processor 375 may be configured to perform aspects in connection with 198 of FIG. 1.

Figure 4:
FIG. 4 is an example communication flow between a UE and a base station in accordance with aspects presented herein.

FIG. 4 is an example communication flow 400 between a UE 404 and a base station 402 in accordance with aspects presented herein. As described herein, the UE 404 may transmit an indication of RRM measurement configuration/capability to the base station 402, at 401. In some aspects, the indication of RRM measurement configuration/capability may indicate that the UE is stationary. In some aspects, the UE 404 may transmit the indication to base station 402 during connection establishment through UE capability signaling. In one aspect, the UE 404 may transmit a single bit indication indicating that the UE is stationary. In some aspects, the UE may indicate that it does not support a set of mobility related features instead of providing an explicit indication that the UE is stationary. In some aspects, the UE may indicate that it does not support one or more of CSI-RS for mobility, UL timing maintenance, or periodic CSI report. The base station 402 may determine that the UE 404 is stationary based on any of the indications about a lack of support for a mobile feature. Example RRM measurements may include intra-frequency measurements, inter-frequency measurements of equal or lower priority, or inter-RAT (Radio Access Technology) frequency measurements of lower priority.

In some aspects, the indication of RRM measurement configuration/capability may be transmitted to base station 402 using UE Assistance Information (UAI) indicating preferred configuration for RRM measurement. In some aspects, the UAI may include an indication that the UE is a stationary UE. In some aspects, the UAI may indicate a set of preferred configurations. In some aspects, the set of preferred configurations may not be a preconfigured by the base station 402.

Responsive to receiving the indication(s) of RRM measurement configuration or capability, at 401, the base station 402 may transmit RRM relaxation criteria indicating relaxation criteria 403 for one or more RRM measurements to the UE 404. The RRM relaxation criteria 403 may include various parameters such as current cell selection RX level value (Srxlev), search threshold $S_{SearchThresholdP}$, reference Srxlev value of the serving cell (dB) SrxlevRef, time period $T_{SearchDeltaP}$ before the UE may relax RRM measurements, or other relevant parameters.

In some aspects, the base station 402 may indicate, e.g., at 403, that the UE may skip its RRM measurements regardless of its location in a cell for a time period as long as the current cell selection RX level value (Srxlev) meets a threshold $S_{SearchThresholdP}$. In some aspects, the Srxlev is determined to satisfy the $S_{SearchThresholdP}$ if (SrxlevRef−Srxlev)<$S_{SearchDeltaP}$.

At 405, after receiving the RRM relaxation criteria, the UE 404 may determine one or more RRM measurements to skip. The UE 404 may skip one or more RRM measurements, e.g., as illustrated at 405, any time after reception of the RRM relaxation criteria 403. For example, the UE 404 be in an active radio resource control (RRC) state when the UE skips the RRM measurement(s), at 405. In another example, the UE may be in an RRC idle or RRC inactive state when the UE skips the RRM measurement(s) at 405. The UE may repeatedly skip RRM measurements, at 405. The UE may make repeated determinations to skip one or more RRM measurements.

In some aspects, the UE 404 may determine whether to skip RRM measurements independent of its location in a cell. In one aspect where the UE is in an RRC idle or RRC inactive state, if Srxlev is larger than $S_{SearchThresholdP}$, the UE may determine to skip one or more defined RRM measurements for a first time period T1. In some aspects, the UE may skip each of the RRM measurements for the first time period T1. In some aspects, the UE 404 may determine to skip one or more defined RRM measurements for a second time period T2 (smaller than T1) if Srxlev is not larger than $S_{SearchThresholdP}$. In some aspects, the UE may skip each of the RRM measurements for the second time period T2. In some aspects, after T1 or T2 passes, the UE may perform another iteration of a determination about whether to skip or perform RRM measurement(s), e.g., at 405.

In some aspects, if a UE is in an RRC idle or inactive state, the UE 404 may still perform measurement on neighbor cells as indicated by the RRM relaxation criteria. The UE may perform measurement on only a subset of neighbor cells as indicated by the RRM relaxation criteria at 407. For example, the base station 402 may indicate, in the RRM relaxation criteria 403, a subset of one or more neighbor cells and their associated synchronization signal blocks (SSBs). The UE 404 may perform RRM measurements on the subset of neighbor cells that are spatially associated with the best K SSBs of its current serving cell. The UE 404 may transmit the measurements at step 409.

Because the UE 404 is stationary, even if the UE 404 is located at a cell edge and is more distant from a base station, the variation in channel conditions or signal blockages can be handled by an intra-cell beam switch. In some aspects, the UE may perform intra-frequency or inter-frequency measurements according to a set of measurement rules for a for a period of $T_{SearchDeltaP}$ before skipping RRM measurements.

In some aspects, when the UE determines to skip the RRM measurements at 405, the UE 404 may be in an RRC active state. In such aspects, the UE 404 may, e.g., based on an indication in the RRM measurement relaxation criteria, relax or stop RRM measurements if the UE is not located at cell edge. For example, in some aspects, the relaxation or reduction of RRM measurement/reporting may be further based on a UE's location within the cell. In some aspects, the RRM measurement relaxation criteria may include a reference signal received power (RSRP) threshold for relaxation. The UE may use the RSRP threshold to determine whether or not to reduce/skip RRM measurement(s). In some aspects, the RRM measurement relaxation criteria may include reference signals received quality (RSRQ) threshold for relaxation. In some aspects, the UE 404 may determine to skip one or more RRM measurements if the UE 404 has satisfied the threshold(s) for a time period T1 or T3. For example, if Srxlev>RSRP threshold for at least T3, the UE 404 may relax or stop RRM measurements, depending on the base station's configuration or the UE's configuration, on the current serving cell.

In some aspects, the UE may redetermine whether to perform RRM measurements after stopping measurements for a time period T4. In some aspects the UE may redetermine whether to perform RRM measurements after determining an occurrence of an event A3 (measurements for a neighbor cell become better than serving cell by at least an offset amount) or event A5 (measurements for the serving cell become worse than a first threshold and measurements for the neighbor become better than second defined threshold) is triggered.

Figure 5:
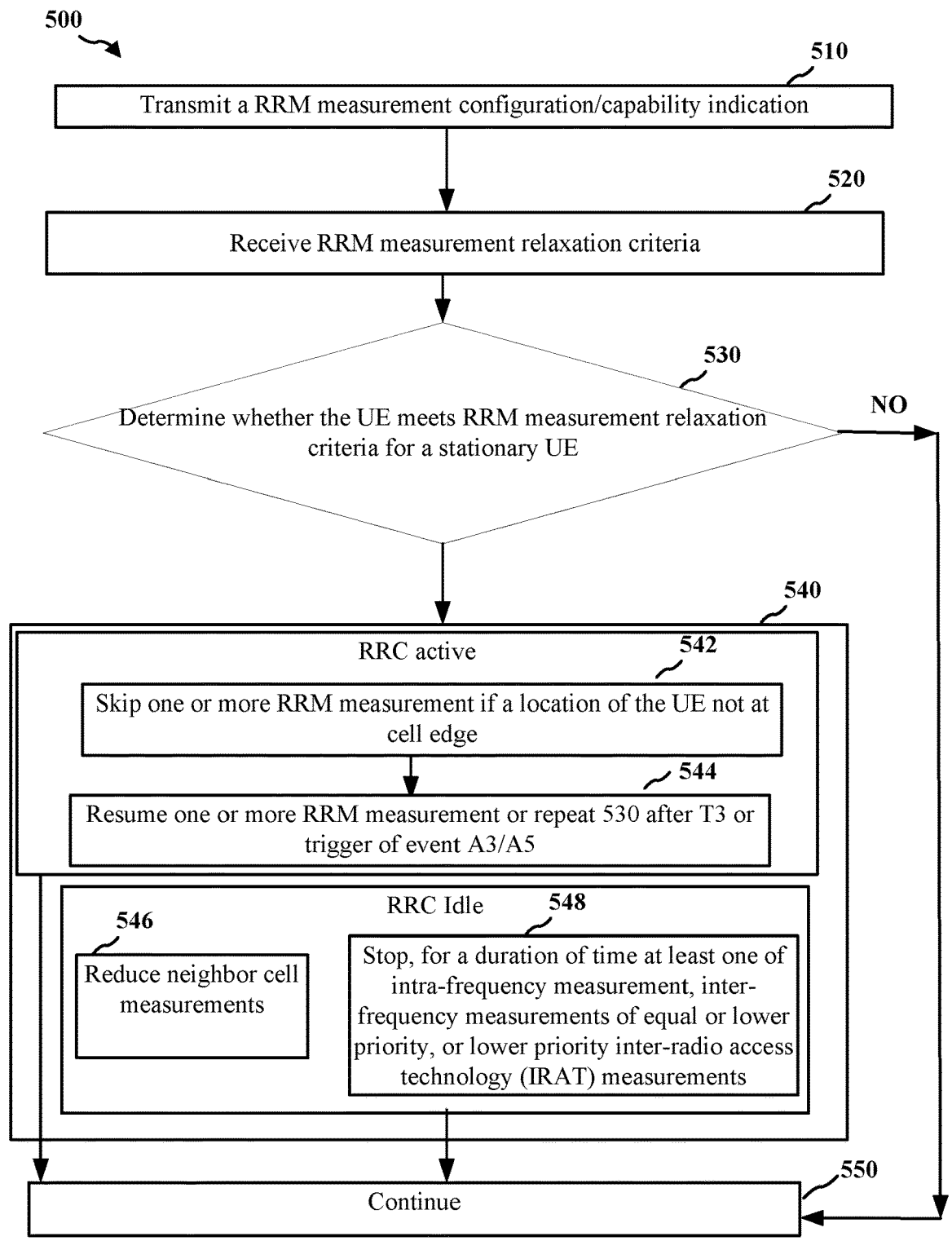
FIG. 5 is a flowchart of a method of wireless communication in accordance with aspects presented herein.

FIG. 5 is a flowchart of a method 500 of wireless communication. The method may be performed by a UE or a component of a UE such as one or more of a modem, a transceiver, etc. (e.g., the UE 104, 350, 404; a processing system, which may include the memory 360 and which may be the entire UE 350 or a component of the UE 350, such as the TX processor 368, the RX processor 356, and/or the controller/processor 359, the apparatus 702). The method may enable the UE 404 to relax its RRM measurements. In some examples, the method may include aspects described in connection with the UE 404 in FIG. 4.

At 510, the UE transmits an RRM measurement configuration/capability indication to a base station. The RRM measurement configuration/capability indication may include aspects described in connection with, by way of example, 401 in FIG. 4. In some aspects, the RRM measurement configuration/capability indication may indicate that the UE is stationary. In some aspects, the indication may be a single bit indication indicating that the UE is stationary. In some aspects, the indication may be an indication indicating lack of a set of mobility related features, no support for CSI-RS for mobility, UL timing maintenance, or periodic CSI report, or the like. Example RRM measurements may include intra-frequency measurements, inter-frequency measurements of equal or lower priority, or inter-RAT frequency measurements of lower priority. In some aspects, 510 may occur during connection establishment between the UE and the base station. In some aspects, 510 may be performed by capability indication component 742 in FIG. 7.

In some aspects, the indication of RRM measurement configuration/capability may be transmitted to the base station using UAI indicating preferred configuration for RRM measurement. In some aspects, the UAI may include an indication that the UE is a stationary UE. In some aspects, the UAI may indicate a set of preferred configurations. In some aspects, the set of preferred configurations may not be preconfigured by the base station.

At 520, the UE receives a set of RRM measurement relaxation criteria and configuration from the base station. In some aspects, the RRM measurement relaxation criteria and configuration includes one or more of a first indication to relax RRM measurements for the stationary UE, a second indication to stop the RRM measurement for the stationary UE, a reference signal received power (RSRP) threshold for relaxation for the stationary UE, a measurement scaling factor for the stationary UE, a relaxation search period for the stationary UE, or a duration for relaxing or stopping the one or more RRM measurements for the stationary UE. In some aspects, the RRM measurement relaxation criteria for the stationary UE that is received in the configuration is different than default measurement relaxation criteria. The RRM measurement relaxation criteria and configuration may include aspects described in connection with, by way of example, 403 in FIG. 4. In some aspects, 520 may be performed by relaxation criteria component 744 in FIG. 7.

At 530, the UE determines whether the UE meets RRM measurement relaxation criteria for a stationary UE. The determination may include aspects described in connection with, by way of example, 405 in FIG. 4. In some aspects, 530 may be performed by determine component 746 in FIG. 7. Depending on the specific situation of the UE, the UE may take various different actions at 540. The various actions at 540 may be performed by the relaxation component 748 in FIG. 7.

If a UE has an active RRC connection, e.g., is in an RRC connected state, and the UE is at a cell edge (e.g., within a defined distance from the cell edge), the UE may determine that the UE cannot skip any RRM measurements. If a UE has an active RRC connection, e.g., is in an RRC connected state, and the UE is not at a cell edge, the UE may skip one or more RRM measurement at step 542. In some aspects, the UE relaxes the RRM measurements on a serving cell based on a radio link reception level value meets the RSRP threshold for relaxation for at least the relaxation search period for the stationary UE. For example, the UE may be allowed, as indicated in the RRM measurement relaxation criteria, to perform reduced RRM measurements, to skip RRM measurements, or to stop RRM measurements if the UE is not located at cell edge. In some aspects, the RRM measurement relaxation criteria may include an RSRP threshold for relaxation. In some aspects, the RRM measurement relaxation criteria may include an RSRQ threshold for relaxation. In some aspects, the UE may determine to skip one or more RRM measurements if the UE has satisfied the threshold(s) for a time period T3. For example, if Srxlev>RSRP threshold for at least T3, the UE may relax or stop RRM measurements, depending on the base station's configuration or the UE's configuration, on the current serving cell. 542 may include aspects described in connection with, by way of example, 405 in FIG. 4.

In some aspects, at 544, the UE may perform a reevaluation based on the RRM measurement relaxation criteria after the duration for relaxing or stopping the one or more RRM measurements for the stationary UE or in response to a trigger, such as by re-performing 530 after stopping measurements for a time period T4. In some aspects the UE may reenter 530 and redetermine whether to perform RRM measurements after determining event A3 (a neighbor cell measurement becomes better than a serving cell measurement by at least an offset amount) or event A5 (a serving cell measurement becomes worse than a first threshold and a neighbor cell measurement becomes better than second defined threshold) is triggered. In some aspects, at 544, the UE may resume default RRM measurements, which may include aspects described in connection with, by way of example, 405 in FIG. 4.

In some aspects, if the UE is in an RRC idle or inactive state, at 546, the UE may reduce neighbor cell measurements in response to determining that the UE meets the RRM measurement relaxation criteria for the stationary UE. In some aspects, the UE may perform the neighbor cell measurements for a subset of neighbor cells. In some aspects, the UE may perform the neighbor cell measurements for a subset of one or more neighbor cells that are spatially associated with a subset of SSBs transmitted by a current serving cell, e.g., a subset of K SSBs having the best measurements. Reducing the neighbor cell measurements at 546 may include aspects described in connection with, by way of example, 405 in FIG. 4. For example, the UE may receive an indication from the base station that SSB #1 is associated with neighbor cells A, B, and C and may indicate that SSB #2 is associated with neighbor cells D and E. The UE may limit RRM measurements to neighbor cells that are spatially associated with the best K SSBs of its current serving cell. For example, K may be an integer number, and the K best SSBs of the current serving cell may correspond to a number, K, of the SSBs from the serving cell with the best measurements for the UE. For example, if K=1 and SSB has the best measurements, the UE may limit RRM measurements to neighbor cells A, B, and C without performing RRM measurements for neighbor cells D and E. In some aspects, the UE determines an association between the neighbor cells and the SSBs based on an indication from a network in system information. In some aspects, the UE determines an association between the neighbor cells and the SSBs based on a configuration by a network. In some aspects, an indication of value of K may be provided in system information for a cell. In some aspects, the indication of value of K may be provided in a configuration for the UE.

In some aspects, if the UE is in an RRC idle or inactive state, at 548, the UE may skip the one or more RRM measurement independent of a location of the UE within a cell. In some aspects, the RRM measurement relaxation criteria for the stationary UE includes a reduced time threshold or a reduced reception level value from a low mobility UE criteria. A low mobility UE criteria may include, by way of example, SrxlevRef minus Srxlev is bigger than $S_{SearchDeltaP}$. In some aspects, SrxlevRef is set to Srxlev when a new serving cell is selected or reselected and Srxlev minus SrxlevRef is bigger than zero and if relaxation criteria is not met for $T_{SearchDeltaP}$. In some aspects, the UE may skip the one or more RRM measurement for a duration of time based on a radio link reception level value for the UE. In some aspects, skipping the one or more RRM measurement includes stopping, for a duration of time, at least one of intra-frequency measurement, inter-frequency measurements of equal or lower priority, or lower priority inter-radio access technology (IRAT) measurements. Skipping the one or more RRM measurements at 548 may include aspects described in connection with, by way of example, 405 in FIG. 4.

At 550, the UE may continue, such as by continuing to determine whether the UE meets RRM measurement relaxation criteria for a stationary UE as appropriate.

Each block in the aforementioned flowcharts of FIG. 5 and aspects performed by the UE 104, 350, 404 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. The system may be a component of the UE 350 may include the memory 360, the TX Processor 368, the RX Processor 356, and the controller/processor 359. Alternatively, the processing system may be the entire UE (e.g., see 350 of FIG. 3).

In one configuration, an apparatus for wireless communication at UE may include means for performing any of the aspects of the flowchart in FIG. 5 or the aspects performed by the UE in FIG. 4. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 6:
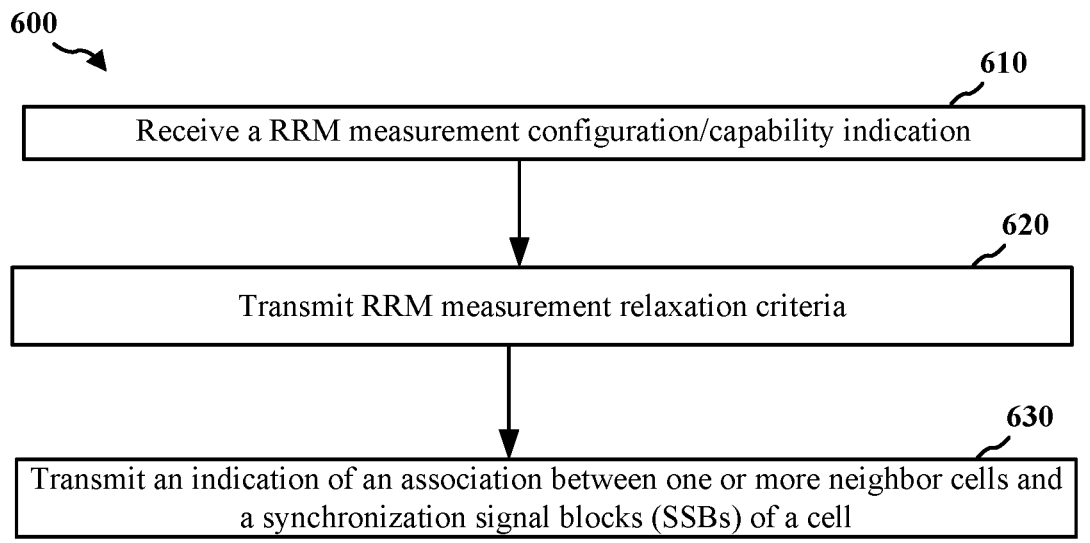
FIG. 6 is a flowchart of a method of wireless communication in accordance with aspects presented herein.

FIG. 6 is a flowchart of a method 600 of wireless communication. The method may be performed by a base station or a component of a base station such as a transceiver (e.g., the base station 102, 180, 310, 402; the processing system, which may include the memory 376 and which may be the entire base station 310 or a component of the base station 310, such as the TX processor 316, the RX processor 370, and/or the controller/processor 375, the apparatus 802). The method may enable the base station to relax RRM measurements for UEs.

At 610, the base station may receive an indication from a UE indicating that the UE is stationary. In some aspects, the indication may comprise a UE capability that is received during connection establishment with the UE. In some aspects, the indication may indicate that the UE does not support one or more mobility related features. In some aspects, the one or more mobility related features include at least one of CRI-RS mobility, uplink timing maintenance, or periodic CSI reports. In some aspects, the indication further includes a preferred configuration for RRM measurements from the UE. In some aspects, the preferred configuration for the RRM measurements is received in UAI. The indication may include aspects described in connection with, by way of example, 401 in FIG. 4. In some aspects, 610 may be performed by capability reception component 842 in FIG. 8.

At 620, the base station may transmit, in response to the indication, a configuration comprising the RRM measurement relaxation criteria for the stationary UE. In some aspects, the configuration includes RRM measurement relaxation criteria comprising one or more of a first indication to relax RRM measurements for the stationary UE, a second indication to stop the RRM measurement for the stationary UE, a reference signal received power (RSRP) threshold for relaxation for the stationary UE, a measurement scaling factor for the stationary UE, a relaxation search period for the stationary UE, or a duration for relaxing or stopping the one or more RRM measurements for the stationary UE. In some aspects, the RRM measurement relaxation criteria for the stationary UE is different than default measurement relaxation criteria. The configuration comprising the RRM measurement relaxation criteria may include aspects described in connection with FIG. 4. In some aspects, 620 may be performed by criteria transmission component 844 in FIG. 8.

At 630, the base station may transmit an indication indicating an association between one or more neighbor cells and SSBs of a cell. For example, the base station may indicate that SSB #1 is associated with neighbor cells A, B, and C and may indicate that SSB #2 is associated with neighbor cells D and E. The indication may include aspects described in connection with FIG. 4. The UE may limit RRM measurements to neighbor cells that are spatially associated with the best K SSBs of its current serving cell. The subset of neighbor cells may be identified based on measurements of the SSBs. For example, K may be an integer number, and the K best SSBs of the current serving cell may correspond to a number, K, of the SSBs from the serving cell with the best measurements for the UE. For example, if K=1 and SSB has the best measurements, the UE may limit RRM measurements to neighbor cells A, B, and C without performing RRM measurements for neighbor cells D and E. In some aspects, an indication of value of K may be provided in system information for a cell. In some aspects, the indication of value of K may be provided in a configuration for the UE. In some aspects, 630 may be performed by association indication component 846 in FIG. 8.

Each block in the aforementioned flowchart of FIG. 6 and aspects performed by the base station 102, 180, 310, 402 may be performed by at least one component of an apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus for wireless communication at a base station may include means for performing any of the aspects described in connection with the flowchart of FIG. 5 or performed by the base station in FIG. 4. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 7:
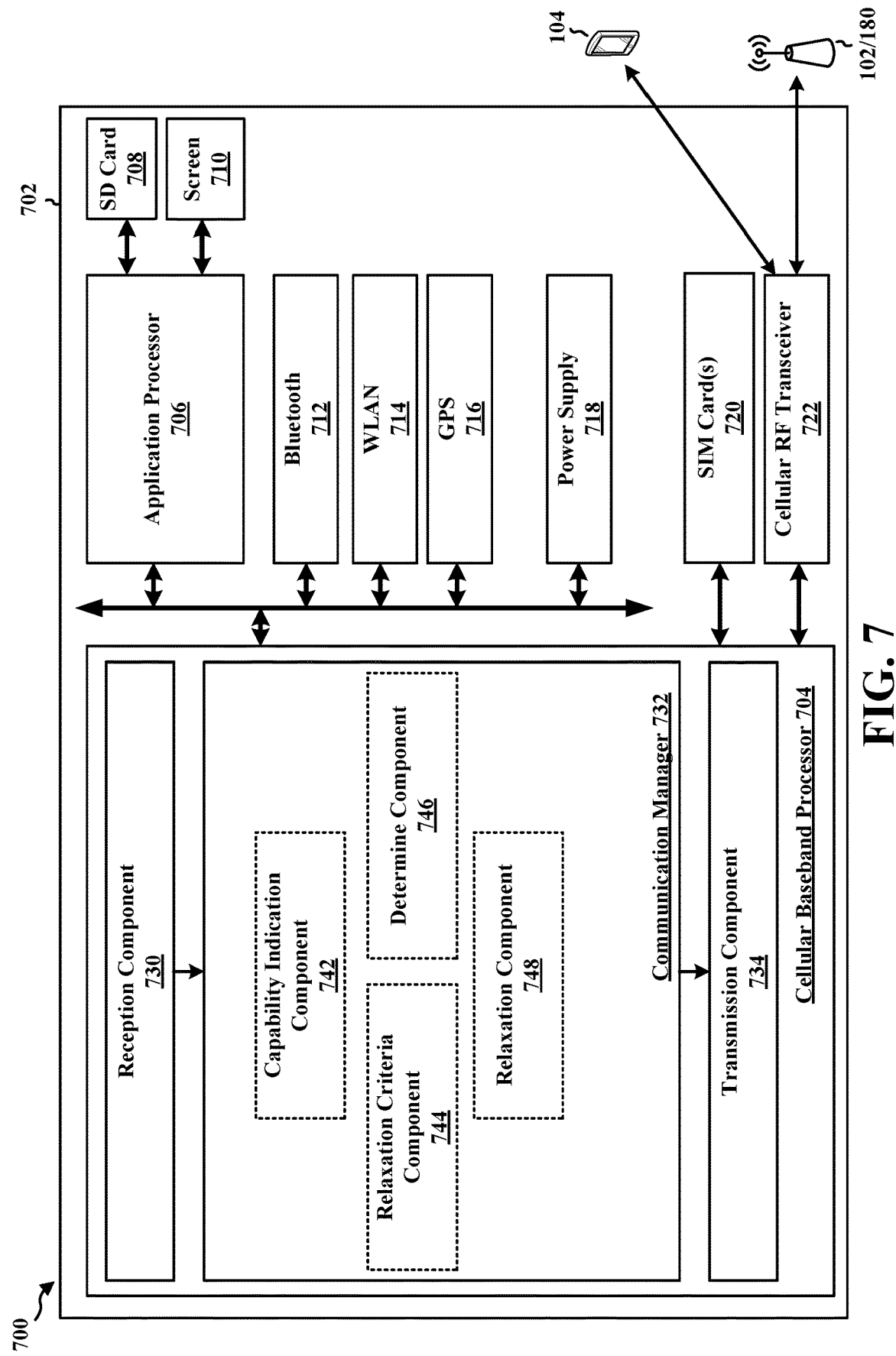
FIG. 7 is a diagram illustrating an example of a hardware implementation for an example apparatus.

FIG. 7 is a diagram 700 illustrating an example of a hardware implementation for an apparatus 702. The apparatus 702 may be a UE or a component of a UE. In some aspects, the apparatus 702 may include a cellular baseband processor 704 (also referred to as a modem) coupled to a cellular RF transceiver 722. The apparatus may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and/or a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 may include a capability indication component 742 that may be configured to transmit an RRM measurement configuration or a capability indication, e.g., as described in connection with 510 in FIG. 5. The communication manager 732 may further include a relaxation criteria component 744 that may be configured to receive RRM measurement relaxation criteria, e.g., as described in connection with 520 in FIG. 5. The communication manager 732 may further include a determine component 746 that may be configured to determine whether the UE meets RRM measurement relaxation criteria for a stationary UE, e.g., as described in connection with 530 in FIG. 5. The communication manager 732 may further include a relaxation component 748 that may be configured to skip one or more RRM measurement based on the RRM measurement relaxation criteria, e.g., as described in connection with 540 in FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving, from a base station, RRM measurement relaxation criteria for a stationary UE. The cellular baseband processor 704 may further include means for skipping one or more RRM measurements based on the RRM measurement relaxation criteria for the stationary UE. The cellular baseband processor 704 may further include means for reducing neighbor cell measurements by performing neighbor cell measurement for a subset of neighbor cells in response to determining that the UE meets the RRM measurement relaxation criteria for the stationary UE. The cellular baseband processor 704 may further include means for receiving a configuration of the RRM measurement relaxation criteria for the stationary UE. The cellular baseband processor 704 may further include means for performing a reevaluation based on the RRM measurement relaxation criteria after the duration for relaxing or stopping the one or more RRM measurements for the stationary UE or in response to a trigger. The cellular baseband processor 704 may further include means for resuming default RRM measurements if the reevaluation does not meet the RRM measurement relaxation criteria. The cellular baseband processor 704 may further include means for transmitting an indication to a base station that the UE is stationary. The cellular baseband processor 704 may further include means for receiving, in response to the indication, a configuration comprising the RRM measurement relaxation criteria for the stationary UE. The cellular baseband processor 704 may further include means for indicating a preferred configuration for RRM measurements in UAI.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
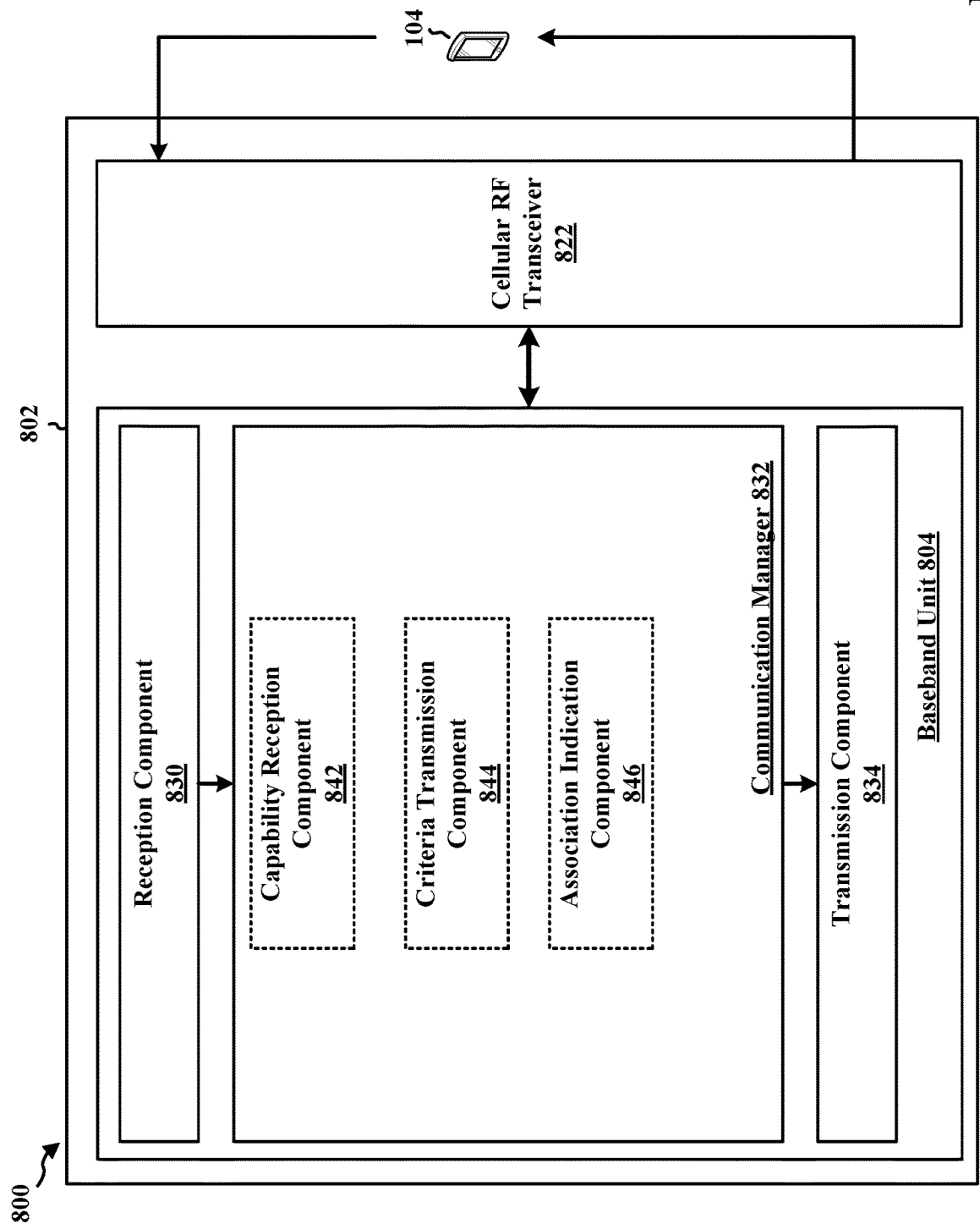
FIG. 8 is a diagram illustrating an example of a hardware implementation for an example apparatus.

FIG. 8 is a diagram 800 illustrating an example of a hardware implementation for an apparatus 802. The apparatus 802 may be a base station or a component of a base station. The apparatus 802 may include a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 may include a capability reception component 842 that may receive an RRM measurement configuration/capability indication, e.g., as described in connection with 610 in FIG. 6. The communication manager 832 may further include a criteria transmission component 844 that may transmit RRM measurement relaxation criteria, e.g., as described in connection with 620 in FIG. 6. The communication manager 832 may further include an association indication component 846 that may transmit an indication of an association between one or more neighbor cells and a SSBs of a cell, e.g., as described in connection with 630 in FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for receiving an indication from a UE that the UE is stationary, wherein the indication comprises a UE capability that is received during connection establishment with the UE. The baseband unit 804 may further include means for transmitting, in response to the indication, a configuration comprising an RRM measurement relaxation criteria for the stationary UE. The baseband unit 804 may further include means for receiving a preferred configuration for RRM measurements from the UE. The baseband unit 804 may further include means for indicating an association between one or more neighbor cells and a SSBs of a cell in system information or a configuration for the UE. The baseband unit 804 may further include means for indicating a number, K, for the UE to perform neighbor cell measurements for a subset of neighbor cells associated with a subset of K SSBs having a highest radio link reception level.

The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station, RRM measurement relaxation criteria for a stationary UE; and skipping one or more RRM measurements based on the RRM measurement relaxation criteria for the stationary UE.

Aspect 2 is the method of aspect 1, wherein the UE is in an RRC idle or RRC inactive state.

Aspect 3 is the method of any of aspects 1-2, wherein the RRM measurement relaxation criteria for the stationary UE includes a reduced time threshold or a reduced reception level value from a low mobility UE criteria.

Aspect 4 is the method of any of aspects 1-3, wherein the UE skips the one or more RRM measurements for a duration of time based on a radio link reception level value for the UE.

Aspect 5 is the method of any of aspects 1-4, wherein skipping the one or more RRM measurements includes stopping, for a duration of time, at least one of intra-frequency measurement, inter-frequency measurements of equal or lower priority, or lower priority IRAT measurements.

Aspect 6 is the method of any of aspects 1-5, wherein the receiving and the skipping are performed by a transceiver of the UE.

Aspect 7 is the method of any of aspects 1-6, further comprising: reducing neighbor cell measurements by performing neighbor cell measurement for a subset of neighbor cells in response to determining that the UE meets the RRM measurement relaxation criteria for the stationary UE.

Aspect 8 is the method of any of aspects 1-7, wherein the UE performs the neighbor cell measurements for the subset of one or more neighbor cells that are associated with a subset of SSBs transmitted by UE's serving cell, wherein the subset of one or more neighbor cells is identified based on measurements for the set of SSBs.

Aspect 9 is the method of any of aspects 1-8, wherein the UE performs the neighbor cell measurements on the subset of one or more neighbor cells associated with the subset of SSBs transmitted by UE's serving cell.

Aspect 10 is the method of any of aspects 1-9, wherein the UE determines an association between the neighbor cells and the SSBs based on an indication from a network in system information or a configuration by the network.

Aspect 11 is the method of any of aspects 1-10, wherein the subset of SSBs comprise K SSBs having highest radio link reception levels from the SSBs transmitted by the serving cell, wherein K is an integer number, and wherein the UE determines a value for K based on either an indication from a network in system information or a configuration by the network.

Aspect 12 is the method of any of aspects 1-11, wherein the UE is in a RRC connected state.

Aspect 13 is the method of any of aspects 1-12, wherein the UE skips the one or more RRM measurements if a location of the UE is a distance from a cell edge.

Aspect 14 is the method of any of aspects 1-13, further comprising: receiving a configuration of the RRM measurement relaxation criteria for the stationary UE, wherein the RRM measurement relaxation criteria includes one or more of: a first indication to relax RRM measurements for the stationary UE, a second indication to stop the RRM measurement for the stationary UE, a RSRP threshold for relaxation for the stationary UE, a measurement scaling factor for the stationary UE, a relaxation search period for the stationary UE, or a duration for relaxing or stopping the one or more RRM measurements for the stationary UE.

Aspect 15 is the method of any of aspects 1-14, wherein the UE relaxes the RRM measurements based on a radio link reception level value meets the RSRP threshold for the relaxation for at least the relaxation search period for the stationary UE.

Aspect 16 is the method of any of aspects 1-15, further comprising: performing a reevaluation based on the RRM measurement relaxation criteria after the duration for relaxing or stopping the one or more RRM measurements for the stationary UE or in response to a trigger.

Aspect 17 is the method of any of aspects 1-16, further comprising: resuming default RRM measurements if the reevaluation does not meet the RRM measurement relaxation criteria.

Aspect 18 is the method of any of aspects 1-17, further comprising: transmitting an indication to the base station that the UE is stationary; and receiving, in response to the indication, a configuration comprising the RRM measurement relaxation criteria for the stationary UE.

Aspect 19 is the method of any of aspects 1-18, wherein the UE transmits the indication as a UE capability that is signaled during connection establishment with the base station.

Aspect 20 is the method of any of aspects 1-19, wherein the indication indicates that the UE does not support one or more mobility related features, and wherein the one or more mobility related features include at least one of CSI-RS mobility, uplink timing maintenance, or periodic channel state information reports.

Aspect 21 is the method of any of aspects 1-20, further comprising: indicating a preferred configuration for RRM measurements in UAI.

Aspect 22 is a method of wireless communication at a base station, comprising: receiving an indication from a UE that the UE is stationary, wherein the indication comprises a UE capability that is received during connection establishment with the UE; and transmitting, in response to the indication, a configuration comprising an RRM measurement relaxation criteria for the stationary UE.

Aspect 23 is the method of aspect 22, wherein the indication indicates that the UE does not support one or more mobility related features, and wherein the one or more mobility related features include at least one of CSI-RS mobility, uplink timing maintenance, or periodic channel state information reports.

Aspect 24 is the method of any of aspects 22-23, further comprising: receiving a preferred configuration for RRM measurements from the UE, wherein the preferred configuration for the RRM measurements is received in UAI.

Aspect 25 is the method of any of aspects 22-24, further comprising: indicating an association between one or more neighbor cells and a SSBs of a cell in system information or a UE configuration.

Aspect 26 is the method of any of aspects 22-25, further comprising: indicating a number, K, for the UE to perform neighbor cell measurements for a subset of neighbor cells associated with a subset of K SSBs having a highest radio link reception level.

Aspect 27 is the method of any of aspects 22-26, wherein the configuration of the RRM measurement relaxation criteria comprises one or more of: a first indication to relax RRM measurements for the stationary UE, a second indication to stop the RRM measurement for the stationary UE, a RSRP threshold for relaxation for the stationary UE, a measurement scaling factor for the stationary UE, a relaxation search period for the stationary UE, or a duration for relaxing or stopping one or more RRM measurements for the stationary UE.

Aspect 28 is the method of any of aspects 22-27, wherein the RRM measurement relaxation criteria for the stationary UE is different than default measurement relaxation criteria.

Aspect 29 is an apparatus for wireless communication including at least one processor coupled to a memory and configured to perform the method of any of aspects 1 to 21.

Aspect 30 is an apparatus for wireless communication including at least one processor coupled to a memory and configured to perform the method of any of aspects 22 to 28.

Aspect 31 is an apparatus for wireless communication including means for performing the method of any of aspects 1 to 21.

Aspect 32 is an apparatus for wireless communication including means for performing the method of any of aspects 22 to 28.

Aspect 33 is a computer-readable medium storing computer executable code, where the code when executed by a processor causes the processor to perform the method of any of aspects 1 to 21.

Aspect 34 is a computer-readable medium storing computer executable code, where the code when executed by a processor causes the processor to perform the method of any of aspects 22 to 28.

What is claimed is:
1. A method of wireless communication at a user equipment (UE), comprising:
receiving, by the UE, radio resource management (RRM) measurement relaxation criteria for a stationary UE, wherein the RRM measurement relaxation criteria for the stationary UE is different from a second RRM measurement relaxation criteria for a mobile UE; and modifying a performance of one or more RRM measurements by the UE based at least in part on the received RRM measurement relaxation criteria for the stationary UE.

2. The method of claim 1, wherein the UE is in a radio resource control (RRC) idle or RRC inactive state.

3. The method of claim 1, wherein the RRM measurement relaxation criteria for the stationary UE includes a reduced time threshold or a reduced reception level value from a low mobility UE criteria.

4. The method of claim 1, wherein the UE modifies the performance of the one or more RRM measurements for a duration of time based on a radio link reception level value for the UE.

5. The method of claim 1, wherein modifying the performance of the one or more RRM measurements includes stopping, for a duration of time, at least one of intra-frequency measurement, inter-frequency measurements of equal or lower priority, or lower priority inter-radio access technology (IRAT) measurements.

6. The method of claim 1, wherein the receiving and the modifying are performed by a transceiver of the UE.

7. The method of claim 1, wherein modifying the performance of the one or more RRM measurements includes:
reducing neighbor cell measurements by performing neighbor cell measurement for a subset of one or more neighbor cells in response to determining that the UE meets the RRM measurement relaxation criteria for the stationary UE.

8. The method of claim 7, wherein the UE performs the neighbor cell measurements for the subset of one or more neighbor cells that are associated with a subset of synchronization signal blocks (SSBs) transmitted by a serving cell of the UE, wherein the subset of one or more neighbor cells is identified based on measurements for the subset of SSBs.

9. The method of claim 8, wherein the UE performs the neighbor cell measurements on the subset of one or more neighbor cells associated with the subset of SSBs transmitted by the serving cell.

10. The method of claim 8, wherein the UE determines an association between the one or more neighbor cells and the SSBs based on an indication from a network in system information or a configuration by the network.

11. The method of claim 8, wherein the subset of SSBs comprise K SSBs having highest radio link reception levels from the SSBs transmitted by the serving cell, wherein K is an integer number, and wherein the UE determines a value for K based on either an indication from a network in system information or a configuration by the network.

12. The method of claim 1, wherein the UE is in a radio resource control (RRC) connected state.

13. The method of claim 12, further comprising:
receiving a configuration of the RRM measurement relaxation criteria for the stationary UE, wherein the RRM measurement relaxation criteria includes one or more of:
a first indication to relax RRM measurements for the stationary UE,
a second indication to stop the one or more RRM measurements for the stationary UE,
a reference signal received power (RSRP) threshold for relaxation for the stationary UE,
a measurement scaling factor for the stationary UE,
a relaxation search period for the stationary UE, or
a duration for relaxing or stopping the one or more RRM measurements for the stationary UE.

14. The method of claim 13, wherein modifying the performance of the one or more RRM measurements includes relaxing the RRM measurements based on a radio link reception level value meeting the RSRP threshold for the relaxation for at least the relaxation search period for the stationary UE.

15. The method of claim 14, further comprising:
performing a reevaluation based on the RRM measurement relaxation criteria after the duration for relaxing or stopping the one or more RRM measurements for the stationary UE or in response to a trigger.

16. The method of claim 15, further comprising:
resuming default RRM measurements if the reevaluation does not meet the RRM measurement relaxation criteria.

17. The method of claim 1, wherein modifying the performance of the one or more RRM measurements includes skipping the one or more RRM measurements based on a location of the UE being a threshold distance from a cell edge.

18. The method of claim 1, further comprising:
transmitting an indication to a base station that the UE is stationary; and
receiving, in response to the indication, a configuration comprising the RRM measurement relaxation criteria for the stationary UE.

19. The method of claim 18, wherein the UE transmits the indication as a UE capability that is signaled during connection establishment with the base station.

20. The method of claim 19, wherein the indication indicates that the UE does not support one or more mobility related features, and wherein the one or more mobility related features include at least one of channel state information reference signal (CSI-RS) mobility, uplink timing maintenance, or periodic channel state information reports.

21. The method of claim 20, further comprising:
indicating a preferred configuration for RRM measurements in UE assistance information (UAI).

22. The method of claim 1, wherein modifying the performance of the one or more RRM measurements includes skipping at least one RRM measurement of the one or more RRM measurements.

23. The method of claim 1, wherein modifying the performance of the one or more RRM measurements includes relaxing at least one RRM measurement of the one or more RRM measurements.

24. The method of claim 1, wherein modifying the performance of the one or more RRM measurements includes performing a reduced number of RRM measurements.

25. A method of wireless communication at a base station, comprising:
receiving an indication from a user equipment (UE) that the UE is stationary, wherein the indication comprises a UE capability that is received by the base station during connection establishment with the UE; and
transmitting, in response to the indication, a configuration comprising a radio resource management (RRM) measurement relaxation criteria for a stationary UE, wherein the RRM measurement relaxation criteria for the stationary UE is different from a second RRM measurement relaxation criteria for a mobile UE.

26. The method of claim 25, wherein the indication indicates that the UE does not support one or more mobility related features, and wherein the one or more mobility related features include at least one of channel state information reference signal (CSI-RS) mobility, uplink timing maintenance, or periodic channel state information reports.

27. The method of claim 25, further comprising:
receiving a preferred configuration for RRM measurements from the UE, wherein the preferred configuration for the RRM measurements is received in UE assistance information (UAI).

28. The method of claim 25, further comprising:
indicating an association between one or more neighbor cells and a synchronization signal blocks (SSBs) of a cell in system information or a UE configuration.

29. The method of claim 28, further comprising:
indicating an integer, K, for the UE to perform neighbor cell measurements for a subset of neighbor cells associated with a subset of K SSBs having a highest radio link reception level.

30. The method of claim 25, wherein the configuration of the RRM measurement relaxation criteria comprises one or more of:
a first indication to relax RRM measurements for the stationary UE,
a second indication to stop one or more RRM measurements for the stationary UE,
a reference signal received power (RSRP) threshold for relaxation for the stationary UE,
a measurement scaling factor for the stationary UE,
a relaxation search period for the stationary UE, or
a duration for relaxing or stopping the one or more RRM measurements for the stationary UE.

31. The method of claim 25, wherein the RRM measurement relaxation criteria for the stationary UE is different than default measurement relaxation criteria.

32. An apparatus for wireless communication at a user equipment (UE), comprising:
a memory; and
at least one processor coupled to the memory and configured to:
receive, by the UE, radio resource management (RRM) measurement relaxation criteria for a stationary UE, wherein the RRM measurement relaxation criteria for the stationary UE is different from a second RRM measurement relaxation criteria for a mobile UE; and
modify a performance of one or more RRM measurements by the UE based at least in part on the received RRM measurement relaxation criteria for the stationary UE.

33. The apparatus of claim 32, wherein to modify the performance of the one or more RRM measurements, the at least one processor is configured to skip at least one of the one or more RRM measurements.

34. The apparatus of claim 32, wherein to modify the performance of the one or more RRM measurements, the at least one processor is configured to relax at least one RRM measurement of the one or more RRM measurements.

35. The apparatus of claim 32, wherein to modify the performance of the one or more RRM measurements, the at least one processor is configured to perform a reduced number of RRM measurements.

36. The apparatus of claim 32, wherein the UE is in a radio resource control (RRC) idle state or an RRC inactive state.

37. The apparatus of claim 32, wherein the RRM measurement relaxation criteria for the stationary UE includes a reduced time threshold or a reduced reception level value from a low mobility UE criteria.

38. The apparatus of claim 32, wherein the UE modifies the performance of the one or more RRM measurements for a duration of time based on a radio link reception level value for the UE.

39. The apparatus of claim 32, wherein modifying the performance of the one or more RRM measurements includes stopping, for a duration of time, at least one of intra-frequency measurement, inter-frequency measurements of equal or lower priority, or lower priority inter-radio access technology (IRAT) measurements.

40. The apparatus of claim 32, wherein the at least one processor is configured to receive the RRM measurement relaxation criteria for the stationary UE and modify the performance of the one or more RRM measurements via a transceiver of the UE.

41. The apparatus of claim 32, wherein modifying the performance of the one or more RRM measurements includes:
reducing neighbor cell measurements by performing neighbor cell measurement for a subset of one or more neighbor cells in response to determining that the UE meets the RRM measurement relaxation criteria for the stationary UE.

42. The apparatus of claim 32, wherein the UE is in a radio resource control (RRC) connected state.

43. The apparatus of claim 32, wherein modifying the performance of the one or more RRM measurements includes skipping the one or more RRM measurements based on a location of the UE being a threshold distance from a cell edge.

44. The apparatus of claim 32, wherein the at least one processor is further configured to:
transmit an indication to a base station that the UE is stationary; and
receive, in response to the indication, a configuration comprising the RRM measurement relaxation criteria for the stationary UE.

45. An apparatus for wireless communication at a base station, comprising:
a memory; and
at least one processor coupled to the memory and configured to:
receive an indication from a user equipment (UE) that the UE is stationary, wherein the indication comprises a UE capability that is received by the base station during connection establishment with the UE; and
transmit, in response to the indication, a configuration comprising a radio resource management (RRM) measurement relaxation criteria for a stationary UE, wherein the RRM measurement relaxation criteria for the stationary UE is different from a second RRM measurement relaxation criteria for a mobile UE.

46. The apparatus of claim 45, wherein the indication indicates that the UE does not support one or more mobility related features, and wherein the one or more mobility related features include at least one of channel state information reference signal (CSI-RS) mobility, uplink timing maintenance, or periodic channel state information reports.

47. The apparatus of claim 45, wherein the at least one processor is further configured to:
receive a preferred configuration for RRM measurements from the UE, wherein the preferred configuration for the RRM measurements is received in UE assistance information (UAI).

48. The apparatus of claim 45, wherein the at least one processor is further configured to:
indicate an association between one or more neighbor cells and a synchronization signal blocks (SSBs) of a cell in system information or a UE configuration.

49. The apparatus of claim 45, wherein the configuration of the RRM measurement relaxation criteria comprises one or more of:
- a first indication to relax RRM measurements for the stationary UE,
- a second indication to stop one or more RRM measurements for the stationary UE,
- a reference signal received power (RSRP) threshold for relaxation for the stationary UE,
- a measurement scaling factor for the stationary UE,
- a relaxation search period for the stationary UE, or
- a duration for relaxing or stopping the one or more RRM measurements for the stationary UE.

50. The apparatus of claim 45, wherein the RRM measurement relaxation criteria for the stationary UE is different than default measurement relaxation criteria.

51. An apparatus for wireless communication at a user equipment (UE), comprising:
- means for receiving, by the UE, radio resource management (RRM) measurement relaxation criteria for a stationary UE, wherein the RRM measurement relaxation criteria for the stationary UE is different from a second RRM measurement relaxation criteria for a mobile UE; and
- means for modifying a performance of one or more RRM measurements by the UE based at least in part on the received RRM measurement relaxation criteria for the stationary UE.

52. An apparatus for wireless communication at a base station, comprising:
- means for receiving an indication from a user equipment (UE) that the UE is stationary, wherein the indication comprises a UE capability that is received by the base station during connection establishment with the UE; and
- means for transmitting, in response to the indication, a configuration comprising a radio resource management (RRM) measurement relaxation criteria for a stationary UE, wherein the RRM measurement relaxation criteria for the stationary UE is different from a second RRM measurement relaxation criteria for a mobile UE.

53. A non-transitory computer-readable medium having instructions stored thereon which, when executed by a processor, perform an operation for wireless communications by a user equipment (UE), the operation comprising:
- receiving, by the UE, radio resource management (RRM) measurement relaxation criteria for a stationary UE, wherein the RRM measurement relaxation criteria for the stationary UE is different from a second RRM measurement relaxation criteria for a mobile UE; and
- modifying a performance of one or more RRM measurements by the UE based at least in part on the received RRM measurement relaxation criteria for the stationary UE.

54. A non-transitory computer-readable medium having instructions stored thereon which, when executed by a processor, perform an operation for wireless communications by a base station, the operation comprising:
- receiving an indication from a user equipment (UE) that the UE is stationary, wherein the indication comprises a UE capability that is received by the base station during connection establishment with the UE; and
- transmitting, in response to the indication, a configuration comprising a radio resource management (RRM) measurement relaxation criteria for a stationary UE, wherein the RRM measurement relaxation criteria for the stationary UE is different from a second RRM measurement relaxation criteria for a mobile UE.

* * * * *